Figure 1:
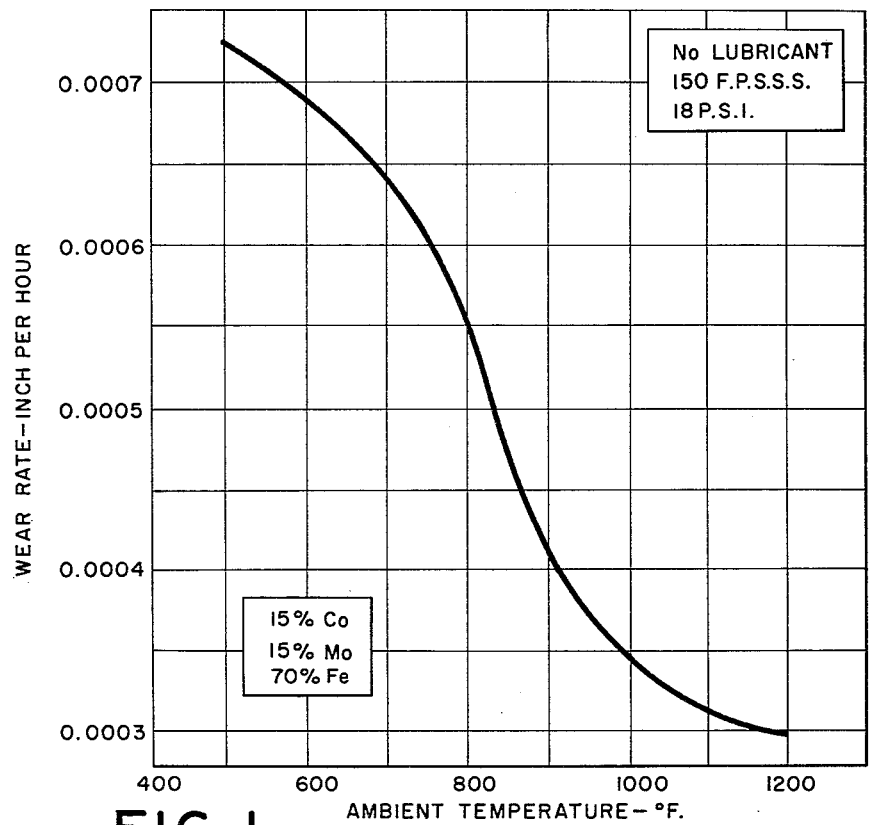

Sept. 11, 1962            D. H. STRONG            3,052,954
METHOD OF USING A MATERIAL AS A
ROLLING CONTACT BEARING
Filed May 25, 1959            2 Sheets-Sheet 1

INVENTOR.
DOUGLAS H. STRONG
BY
*Eber J. Hyde*
ATTORNEY

Sept. 11, 1962 D. H. STRONG 3,052,954
METHOD OF USING A MATERIAL AS A
ROLLING CONTACT BEARING
Filed May 25, 1959 2 Sheets-Sheet 2

INVENTOR.
DOUGLAS H. STRONG
BY
*Elver J. Hyde*
ATTORNEY

United States Patent Office 3,052,954
Patented Sept. 11, 1962

3,052,954
METHOD OF USING A MATERIAL AS A
ROLLING CONTACT BEARING
Douglas H. Strong, Willoughby, Ohio, assignor to Clevite
Corporation, Cleveland, Ohio, a corporation of Ohio
Filed May 25, 1959, Serial No. 815,718
10 Claims. (Cl. 29—148.4)

This invention pertains to a method of using a material as a rolling contact bearing.

For a great number of years there has been a need for improved materials for rolling contact bearings, such for example as ball bearings, roller bearings, needle bearings etc., which will withstand high temperature operation as well as low temperature operation, which will withstand the thermal shock incident to starting cold (about −67° F.) and warming up to a high ambient temperature in a short time period and which will thereafter run for a long period of time at the elevated temperature, and which will be compatible with lubricating materials with which it may be used, and which, in the absence of lubricating materials, will have an inherent lubricating quality permitting long operation in the "dry" state, especially at high temperatures on the order of about 1200° F. or even higher.

An outstanding use has been discovered for material consisting essentially of 5 to 20% cobalt, 5 to 20% molybdenum and the balance iron, and outstanding is the material consisting essentially of 15% cobalt, 15% molybdenum and 70% iron. This use is in rolling contact bearings such for example as for ball bearings, roller bearings, needle bearings etc.

The above defined material when rolled against itself achieves its maximum usefulness, such for example as when the bearing races as well as the rolling bearing elements (balls, rollers, needles, etc.) are made of the outstanding materials. However, significant improvement in bearing performance is achieved when the rolling elements alone, or the races alone, are made of the material. The cage may or may not be made of the new material, depending upon conditions of operation.

In a search for better materials from which to make the several parts of a rolling contact bearing the following list of desirable characteristics has been used as a criterion to judge the relative merits of the materials tested.

(1) The several parts and especially the races and the rolling elements must have good load bearing characteristics, and if the bearing is to be used at high temperatures the material must not soften too much as the temperature increases. Preferably the material should be hardenable.

(2) The material should be corrosion resistant to the environment in which the bearing is to be used, such for example as environments of corrosive gasses, lubrication materials, etc. and the material should resist excessive oxidation or scaling which would interfere with rolling motion. A thin, uniform adherent film of molybdenum oxide, however, is essential for high temperature, dry operation of the bearings.

(3) The several parts should have anti-frictional characteristics to obviate wear as much as possible.

(4) Toughness—the material must be strong and must not be brittle.

(5) The material must resist fracture or damage by extremely fast heating rates if it is to be used in applications such as gas turbines.

(6) The thermal expansion of the material should match as closely as possible expansion rates of its surrounding parts.

(7) Heat conductivity should be good.

(8) The material must be machinable by standard practices.

(9) The material should not be too expensive, and it is highly desirable that it contain a minimum of strategic materials.

In many of the above requirements it will be seen that a rolling contact material is similar to a sliding surface material such as is used in a seal or a sliding surface bearing, but because of the fundamental differences between rolling and sliding bearings it cannot be said that a given material which is good for one application will be good for the other.

A sliding surface bearing by its nature has a large area of contact between the relatively moving parts, and a rolling contact bearing theoretically has "point" or "line" contact between the rolling elements and the races. When loaded, of course the "point" of contact becomes a very small oval shaped area, and the "line" contact becomes an elongated area of contact due to the elastic deformation of the engaging metals. In any event, the rolling contact bearings must have races and bearing elements which are very hard compared to the materials used in sliding surface bearings, and must have resistance to plastic deformation and should have good fatigue properties.

Another outstanding difference between the rolling contact and sliding surface contact bearings arises from the fact that in the sliding surface bearing (sleeve bearings, journal bearings, wear plates, piston rings, seals, etc.) there are two loaded surfaces of large area which rub against each other and consequently it is imperative that the coefficient of friction between the two materials be as low as possible. In a rolling contact bearing the relative motion between the several parts is substantially a rolling motion, though there is some sliding contact between bearing elements and races, and there is of course rubbing action between the bearing elements and the cage. For this reason the cage is often made of material such as is used in a sliding surface bearing, but in the past the races and rolling elements have been made of load bearing material, not sliding surface material.

With the advent of rockets, jets, hot gas engines, etc. the need has arisen for bearings of all kinds which will withstand high temperatures, sometimes only for a few minutes, and often it is impossible or very inconvenient to supply the bearing with lubricating material or coolant.

It is, therefore, an object of the present invention to provide a new method of using an alloy of cobalt, molybdenum and iron as a rolling contact bearing, wherein the races, the rolling elements and the cage are all made of the alloy, and wherein the use of such bearings at elevated temperatures, with or without lubricant, achieves outstanding results.

An object of the present invention is the provision of a new method of using a particular material or an improved rolling contact bearing, preferably rolling in contact with a piece of the same or closely similar material.

Another object of the present invention is the provision of a method of using a material as a rolling contact bearing, against a similar material or against a dissimilar material, with or without added lubricating materials, especially at elevated temperatures.

For a better understanding of the present invention, together with other and further objects thereof, reference is had to the following description taken in connection with the accompanying drawings, and its scope will be pointed out in the appended claims.

FIGURE 1 of the drawing is a graph showing the wear rate of the material used in the method of the present invention, as the ambient temperature rises to 1200° F.

Figure 2:
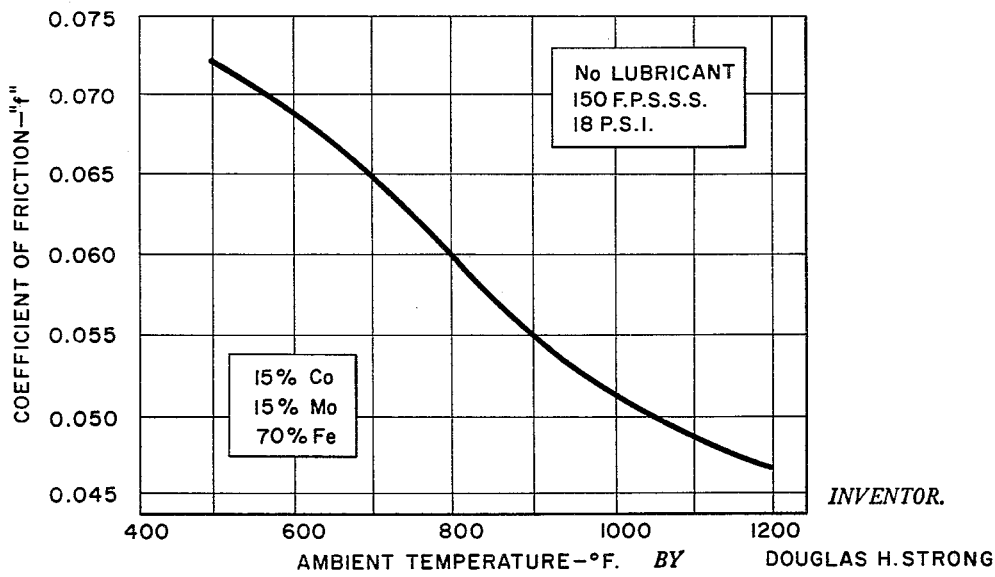

FIGURE 2 of the drawing is a graph showing the coefficient of friction of the material as the ambient temperature increases to around 1200° F.

Figure 3:
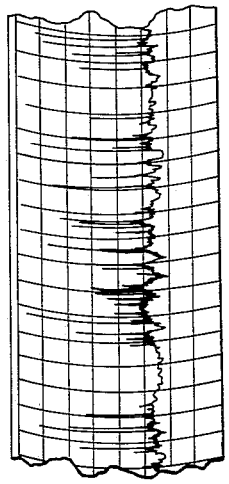
Figure 5:
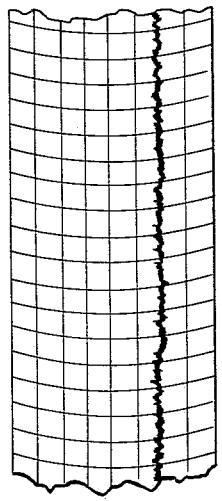
Figure 4:
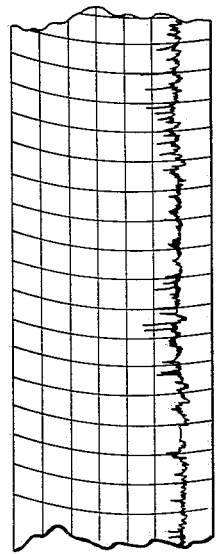

FIGURES 3 to 5 are drawings taken from test data, showing torque charts for three types of materials including one material of the present invention.

An aspect of the present invention lies in the process of making a rolling contact bearing wherein at least one, and preferably both, of the bearing races and the rolling bearing elements such as balls, rollers etc., are made of a material consisting essentially of 5 to 20% cobalt, 5 to 20% molybdenum and the balance substantially all iron. The cages may or may not be made of the same material, and within the ranges indicated the best material consists essentially of 15% cobalt, 15% molybdenum and 70% iron.

An outstanding new use has been discussed for the above alloy. It comprises the process of using the material in one or more parts of a rolling contact bearing, such as a ball bearing, roller bearing, needle bearing or the like. Preferably all parts except possibly the cage should be made of the alloy, and the cage may be made of the other materials if desired although for most applications the cage may also beneficially be made of the alloy. The material may be used at high temperatures without added lubricant, but in this circumstance the material should be in an oxidizing atmosphere to cause the formation of a lubricating compound.

Extended tests have shown that the alloy is outstanding for its intended purpose at temperatures up to 1200° F. and the slope of its wear-rate and coefficient of friction curves at 1200° F. indicate that the material will continue to be outstanding at even higher temperatures, perhaps even up to 1700° F.

The coefficient of linear expansion of the material for various temperatures is as follows:

| Temp. (F): | In./in./° F. |
| --- | --- |
| 75–300 | $4.5 \times 10^{-6}$ |
| 300–600 | $4.95 \times 10^{-6}$ |
| 600–900 | $5.50 \times 10^{-6}$ |
| 900–1200 | $5.80 \times 10^{-6}$ |
| 1200–1500 | $6.85 \times 10^{-6}$ |
| 75–1500 | $5.60 \times 10^{-6}$ |

For comparison the coefficient of linear expansion of cast iron from 32 to 932° F. is $7 \times 10^{-6}$ indicating that the bearings made from the alloy can be used with cast iron parts without suffering from a radically different coefficient of thermal expansion.

The density of the material is about 8 g./cc., and its hardness on the Rockwell A scale in the unhardened condition at various temperatures is as follows:

| Temp. (F.): | Rockwell hardness |
| --- | --- |
| 75 | RA 66 |
| 600 | RA 57 |
| 1000 | RA 45 |
| 1200 | RA 35 |

After age hardening, the material at room temperature is at least Rockwell C 54.

The test data from which the curves of FIGURES 1 and 2 were drawn was obtained by rubbing together two pieces of the 15/15/70 alloy at 150 feet per second surface speed and 18 pounds per square inch loading without externally supplied lubrication.

It is to be noted that as the temperature increases the coefficient of friction decreases and the wear rate drops. This is highly desirable as it indicates that there is "internal lubrication" of the parts. The slope of the curves at temperature 1200° F. indicates that the material may be used at temperatures above 1200° F. for appreciable periods of time, and perhaps that the material can be used in the temperature range 1700°–1800° F. for "one shot" applications.

In order to achieve the improved characteristics at elevated temperatures the bearing should operate in an oxidizing atmosphere, it being probable that the molybdenum oxide formed at the elevated temperature provides an "internal" lubricant. However, tests indicate that an alloy of molybdenum alone in iron will not be as good a bearing as one containing in addition a given amount of cobalt. FIGURES 3 to 5 show a series of torque charts. FIGURE 3 is for an alloy of 15% molybdenum–85% iron, and indicates an unsatisfactory high temperature bearing material because the torque characteristics are very unstable. FIGURE 4 is a torque chart for an alloy of 10% molybdenum and 90% iron, and while the roughness is better it still is not quite satisfactory. FIGURE 5 is a torque chart for an alloy containing 10% cobalt, 10% molybdenum and 80% iron and indicates a satisfactory torque characteristic; it being apparent that cobalt is essential to smooth torque characteristics.

While maximum benefits of the use of the alloy as a rolling contact bearing are achieved when all of the bearing parts (or all but the cage) are made of the alloy, tests indicate that substantial improvements are made if only the races, or only the rolling elements are made of the alloy, the other parts being made of SAE 52100, nitrided steel, cast iron or high speed (tool) steels. Thus it is within the scope of the present invention to use rolling contact bearings in a high temperature, oxidizing atmosphere wherein only one, or both, races are made of the above listed materials and the rolling contact elements (balls, rollers, etc.) are made of the cobalt, molybdenum iron alloy. It is likewise within the scope of the invention to use rolling contact bearings in a high temperature oxidizing atmosphere wherein one or both of the races are made of the cobalt-molybdenum-iron alloy and the rolling contact elements are made from the above listed or other usual rolling contact bearing materials.

While the present invention achieves its maximum usefulness in the use of a composition of matter as a rolling contact bearing such as a ball bearing, roller bearing, needle bearing or the like, there is another use which in its broadest aspect may be termed a rolling contact bearing, but which not all persons will immediately recognize as such, and that is as a gear material. A gear meshes with another gear primarily with a rolling load transfer relationship, with deformation of both engaging gear teeth, similar to a rolling contact bearing. Also, a gear meshes with another gear with a limited but definite amount of slippage between the engaging teeth, and again this action is quite similar to the action which takes place in a rolling contact bearing, particularly in a ball bearing.

The previously listed requirements for a rolling contact bearing material are valid for a gear material. The present invention consequently is applicable to gears particularly those used at high temperatures in an oxidizing atmosphere, with or without lubrication.

I claim:

1. The process of making a rolling contact bearing which comprises the steps of providing at least one bearing race of material consisting essentially of 5 to 20 percent cobalt, 5 to 20 percent molybdenum and the balance iron, and rolling against said at least one race rolling bearing element means having substantially the same composition.

2. The invention as set forth in claim 1, further characterized by said rolling contact bearing comprising two bearing races of the aforesaid material, and a plurality of said rolling bearing element means.

3. The process as set forth in claim 2, further characterized by said two races and by said rolling bearing element means consisting essentially of 15% cobalt, 15% molybdenum and 70% iron.

4. The process as set forth in claim 1, further characterized by using said bearing at an elevated temperature in the range of from about 1200 degrees F. to about 1700 degrees F. in an oxidizing atmosphere and in the absence of externally applied lubrication whereby a thin adherent film of molybdenum oxide is formed on the bearing surface.

5. The process of making a rolling contact bearing which comprises the steps of providing at least one bearing race, and rolling against said at least one bearing race rolling bearing element means of material consisting essentially of 5 to 20 percent cobalt, 5 to 20 percent molybdenum and the balance iron.

6. The process as set forth in claim 5, further characterized by said bearing element consisting essentially of 15% cobalt, 15% molybdenum and 70% iron.

7. The process as set forth in claim 6 further characterized by casting said bearing element.

8. The process as set forth in claim 5, further characterized by using said bearing at an elevated temperature in the range of from about 1200 degrees F. to about 1700 degrees F. in an oxidizing atmosphere and in the absence of externally applied lubrication whereby a thin adherent film of molybdenum oxide is formed on the bearing surface.

9. The process of making a rolling contact bearing which comprises the steps of providing at least one bearing element of material consisting essentially of 5 to 20 percent cobalt, 5 to 20 percent molybdenum, and the balance iron, and rolling against said one bearing element a second bearing element.

10. The process as set forth in claim 9, further characterized by said second bearing element consisting essentially of 5 to 20 percent cobalt, 5 to 20 percent molybdenum, and the balance iron.

References Cited in the file of this patent

UNITED STATES PATENTS

| | | |
|---|---|---|
| 1,948,246 | Seaman | Feb. 20, 1934 |
| 1,986,024 | Sykes | Jan. 1, 1935 |
| 2,136,946 | McCurdy | Nov. 15, 1938 |
| 2,588,421 | Shepard | Mar. 11, 1952 |
| 2,609,256 | Baker | Sept. 2, 1952 |
| 2,685,545 | Sindeband | Aug. 3, 1954 |
| 2,697,645 | Mitchell | Dec. 21, 1954 |

FOREIGN PATENTS

| | | |
|---|---|---|
| 385,934 | Great Britain | Mar. 28, 1931 |